(12) United States Patent
Xu et al.

(10) Patent No.: US 8,028,337 B1
(45) Date of Patent: Sep. 27, 2011

(54) PROFILE-AWARE FILTERING OF NETWORK TRAFFIC

(75) Inventors: Kuai Xu, St. Paul, MN (US); Zhi-Li Zhang, Minneapolis, MN (US); Supratik Bhattacharyya, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 999 days.

(21) Appl. No.: 11/463,723

(22) Filed: Aug. 10, 2006

Related U.S. Application Data

(63) Continuation of application No. 11/214,519, filed on Aug. 30, 2005, and a continuation of application No. 11/214,502, filed on Aug. 30, 2005.

(51) Int. Cl.
*G06F 11/00* (2006.01)

(52) U.S. Cl. .......... 726/23; 726/4; 726/22; 709/224; 709/237; 709/239; 370/342; 370/465

(58) Field of Classification Search .......... 370/342, 370/465; 455/431, 436; 726/22–25; 709/227–229, 709/220–222
See application file for complete search history.

(56) References Cited

U.S. PATENT DOCUMENTS

| | | | |
|---|---|---|---|
| 5,706,290 A * | 1/1998 | Shaw et al. .......... | 370/465 |
| 5,937,349 A * | 8/1999 | Andresen .......... | 455/431 |
| 6,006,259 A | 12/1999 | Adelman | |
| 6,091,362 A | 7/2000 | Stilp | |
| 6,181,687 B1 | 1/2001 | Bisdikian | |
| 6,259,690 B1 | 7/2001 | Yoshizawa | |
| 6,427,114 B1 | 7/2002 | Olsson | |
| 6,549,538 B1 | 4/2003 | Beck | |
| 6,594,268 B1 | 7/2003 | Aukia | |
| 6,728,748 B1 | 4/2004 | Mangipudi | |
| 6,772,226 B1 | 8/2004 | Bommareddy | |
| 6,816,903 B1 | 11/2004 | Rakoshitz | |
| 6,853,846 B1 | 2/2005 | Lin | |
| 6,975,638 B1 | 12/2005 | Chen | |
| 6,996,062 B1 | 2/2006 | Freed | |
| 7,006,472 B1 | 2/2006 | Immonen | |
| 7,042,848 B2 | 5/2006 | Santiago | |
| 7,092,438 B2 | 8/2006 | Rouphael | |
| 7,113,932 B2 | 9/2006 | Tayebnejad | |
| 7,130,761 B2 | 10/2006 | Hall | |
| 7,296,018 B2 | 11/2007 | Abe | |
| 7,383,258 B2 | 6/2008 | Harik | |
| 7,406,653 B2 | 7/2008 | Ide | |
| 7,523,493 B2 * | 4/2009 | Liang et al. .......... | 726/13 |
| 7,630,381 B1 * | 12/2009 | Roskind et al. .......... | 370/395.42 |
| 7,840,664 B2 | 11/2010 | Dugatkin | |
| 2002/0122432 A1 | 9/2002 | Chaskar | |

(Continued)

OTHER PUBLICATIONS

Christian Estan, Stefan Savage, George Varghese, Automatically Inferring Patterns of Resource Consumption in Network Traffic, Proceedings of the 2003 conference on applications, technologies, architectures, and protocols for computer communications, Aug. 25-29, 2003, Karlsruhe, Germany.

(Continued)

*Primary Examiner* — David Pearson
*Assistant Examiner* — Gregory Lane

(57) ABSTRACT

A system and a method for profiling traffic on a computer network. Flows are observed traversing a communication link. Relative uncertainty values are computed for the dimensions of these flows. These relative uncertainty values are used to identify dominant feature values in the various flow dimensions. Flows having these dominant feature values are filtered.

11 Claims, 12 Drawing Sheets

U.S. PATENT DOCUMENTS

| | | | |
|---|---|---|---|
| 2002/0186661 A1 | 12/2002 | Santiago | |
| 2003/0081659 A1 | 5/2003 | Yousef | |
| 2003/0103525 A1 | 6/2003 | Wahl | |
| 2004/0039820 A1 | 2/2004 | Colby | |
| 2004/0054925 A1* | 3/2004 | Etheridge et al. | 713/201 |
| 2004/0077349 A1* | 4/2004 | Barak et al. | 455/436 |
| 2004/0153854 A1* | 8/2004 | Agrawal et al. | 714/43 |
| 2004/0162901 A1 | 8/2004 | Mangipudi et al. | |
| 2004/0250124 A1 | 12/2004 | Chesla | |
| 2005/0050336 A1* | 3/2005 | Liang et al. | 713/188 |
| 2005/0135416 A1 | 6/2005 | Ketchum | |
| 2005/0144148 A1 | 6/2005 | Hatonen | |
| 2005/0185722 A1* | 8/2005 | Abe et al. | 375/259 |
| 2006/0025161 A1 | 2/2006 | Funato | |
| 2006/0053123 A1 | 3/2006 | Ide | |
| 2006/0182118 A1 | 8/2006 | Lam | |
| 2006/0242706 A1 | 10/2006 | Ross | |
| 2007/0058632 A1 | 3/2007 | Back | |
| 2007/0070907 A1 | 3/2007 | Kumar | |
| 2007/0079379 A1 | 4/2007 | Sprosts | |
| 2008/0134336 A1 | 6/2008 | Rihn | |

OTHER PUBLICATIONS

Wenke Lee, Dong Xiang, Information—Theoretic Measures for Anomaly Detection, Proceedings of the 2001 IEEE Symposium on Security and Privacy, p. 130, May 14-16, 2001.

Paul Barford, Jeffery Kline, David Plonka, Amos Ron, A Signal analysis of Network Traffic anomalies, Proceedings of the 2nd ACM SIGCOMM workshop on Internet measurement, Nov. 6-8, 2002, Marseille, France.

Balachander Krishnamurthy, Subhabrata Sen, Yin Zhang, Yan Chen, Sketch-Based Change Detection: Methods, Evaluation, and Applications, Proceedings of the 3rd ACM SIGCOMM conference on Internet measurement, Oct. 27-29, 2003, Miami Beach, FL USA.

* cited by examiner ns, which are hereby incorporated by reference: U.S. patent application Ser. No. 11/214,519, filed Aug. 30, 2005, entitled "Identifying Significant Behaviors Within Network Traffic"; and U.S. patent application Ser. No. 11/214,502, filed Aug. 30, 2005, entitled "Generating Profiles of Network Traffic."

PROFILE-AWARE FILTERING OF NETWORK TRAFFIC

CROSS-REFERENCE TO RELATED APPLICATIONS

This application is related by subject matter to the inventions disclosed in the following commonly assigned applications, which are hereby incorporated by reference: U.S. patent application Ser. No. 11/214,519, filed Aug. 30, 2005, entitled "Identifying Significant Behaviors Within Network Traffic"; and U.S. patent application Ser. No. 11/214,502, filed Aug. 30, 2005, entitled "Generating Profiles of Network Traffic."

STATEMENT REGARDING FEDERALLY SPONSORED RESEARCH OR DEVELOPMENT

Not applicable.

BACKGROUND

As computer networks such as the Internet continue to grow in size and complexity, the challenge of effectively provisioning, managing and securing networks has become linked to a deep understanding of their traffic. Indeed, recent spates of cyber-attacks and the frequent emergence of applications affecting Internet traffic dynamics demonstrate the importance of identifying and profiling significant communication patterns within network traffic data. Nevertheless, because of the vast quantities of data and the wide diversity of traffic on large networks, developing a comprehensive understanding of the collected data remains a daunting and unfulfilled task. Most of the prior work in this area has focused on specific aspects of traffic or applied metrics that are deemed interesting a priori to identify significant network events of interest. For example, several systems today focus on techniques for identifying port scans or for analyzing worm and other exploit activities on the Internet. Further, signature-based intrusion detection systems look for well-known signatures or patterns in network traffic, while several anomaly detection systems have been developed using data mining techniques.

However, there are currently insufficient techniques in the art directed towards generating general profiles of traffic in terms of behaviors, i.e., communication patterns of end-hosts and services. The need for such profiles has become increasingly imperative and urgent in light of wide spread cyber attacks and the frequent emergence of disruptive applications that can rapidly alter the dynamics of network traffic and bring down valuable Internet services. Complicating the task of profiling during these cyber attacks is the large volume of network traffic that accompanies such attacks. Indeed, there is a need for a robust real-time traffic behavior profiling system that is capable of continuously extracting and analyzing "interesting" and "significant" traffic patterns on high-speed network links, even in the face of sudden surge in traffic (e.g., when the network is under a denial-of-service attack).

SUMMARY

The present invention provides systems and methods for profiling traffic on a computer network. In one aspect of an embodiment of the present invention, flows are observed traversing a communication link. Relative uncertainty values are computed for the dimensions of these flows. These relative uncertainty values are used to identify dominant feature values in the various flow dimensions. Flows having these dominant feature values are filtered.

Another aspect of an embodiment of the present invention includes a system for profiling flows traversing a network link. A flow table stores flows observed traversing the network link. A filtering component is configured to filter flows having a dominant feature value. A cluster extractor is configured to group flows from the flow table into significant clusters, and a behavior classifier assigns these significant clusters to behavior classes.

A further aspect of an embodiment of the present invention includes a computerized method for storing flows observed traversing a network link. A sampling ratio is used to select flows observed traversing the network link. The selected flows are stored in a flow table. Relative uncertainty values are computed for the dimensions of the selected flows. These relative uncertainty values are used to identify dominant feature values. Flows having these dominant feature values are filtered from storage in the flow table.

It should be noted that this Summary is provided to generally introduce the reader to one or more selected concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
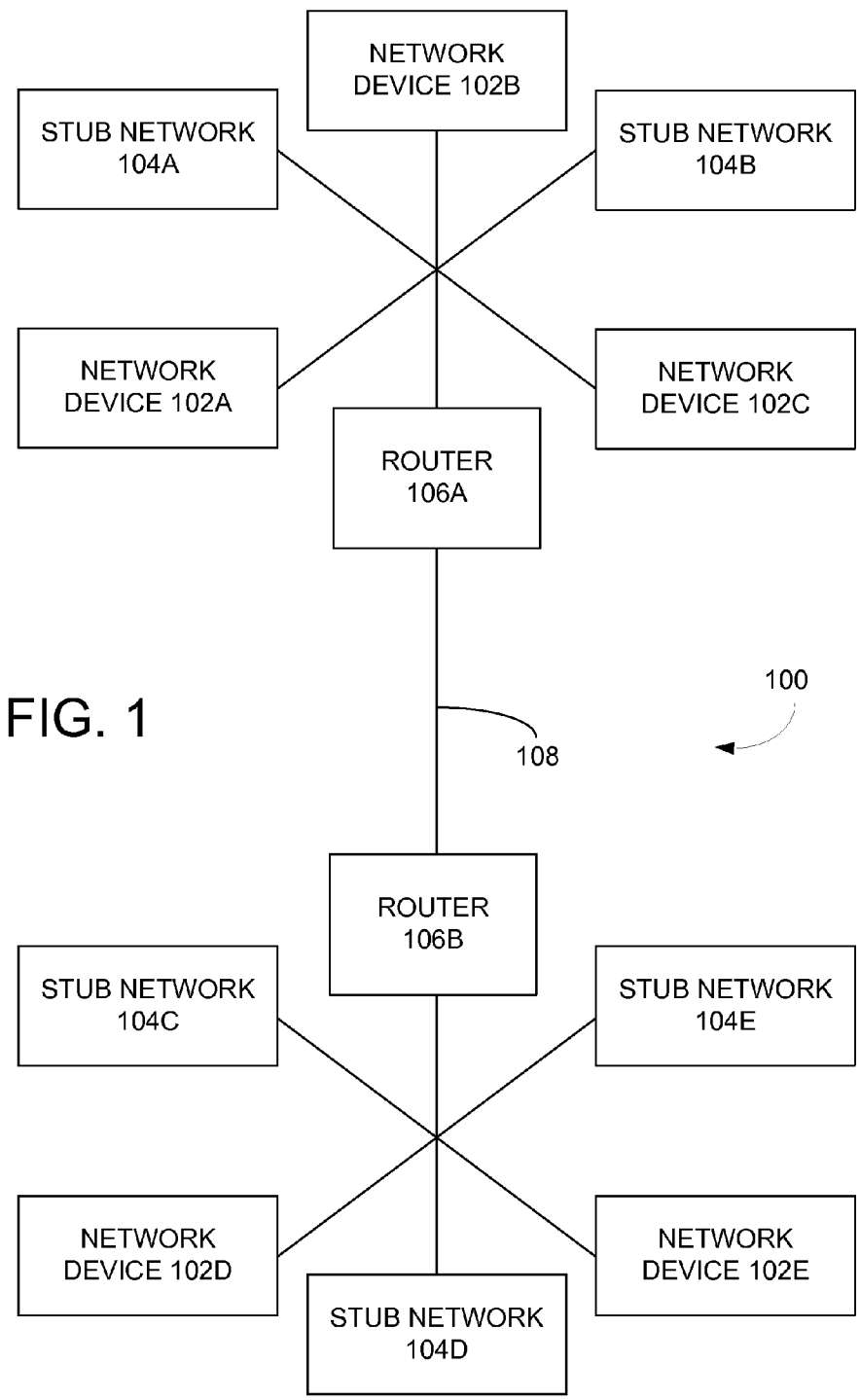
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for identifying significant behaviors from network traffic and for profiling these significant events. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Various embodiments of the present invention compute and apply a value indicating a degree of variability, uniformity or uncertainty in a set of data values. Techniques for generating such values are well known in the art. For example, consider a random variable X that may take $N_X$ discrete values. Suppose X was randomly sampled or observed for m times, which induces an empirical probability distribution on X, $p(x_i)=m_i/m$, $x_i \in X$, where $m_i$ is the frequency or number of times we observe X taking the value $x_i$. The (empirical) entropy of X may be defined as:

$$H(X) := -\sum_{x_i \in X}$$

where by convention $0 \log 0 = 0$.

As known to those skilled in the art, entropy measures the "observational variety" in the observed values of X. It may be noted that unobserved possibilities (due to $0 \log 0 = 0$) do not enter the measure, and $0 \leq H(X) \leq H_{max}(X) := \log \min\{N_X, m\}$. $H_{max}(X)$ may be referred to as the maximum entropy of (sampled) X, as $2^{H_{max}(X)}$ is the maximum number of possible unique values (i.e., "maximum uncertainty") that the observed X can take in m observations. Clearly, H(X) is a function of the support size $N_X$ and sample size m. Assuming that $m \geq 2$ and $N_X \geq 2$ (otherwise there is no "observational variety"), the standardized entropy may be referred to as relative uncertainty (hereinafter "RU"), as it provides an index of variety or uniformity regardless of the support or sample size. RU may be defined as:

$$RU(X) := \frac{H(X)}{H_{max}(X)} = \frac{H(X)}{\log \min\{N_X, m\}}$$

Clearly, if RU(X)=0, then all observations of X are of the same kind, i.e., p(x)=1 for some $x \in X$. Thus, observational variety is completely absent. More generally, let A denote the (sub)set of observed values in X, i.e., $p(x_i) > 0$ for $x_i \in A$. Suppose $m \leq N_X$. Then RU(X)=1 if and only if $|A|=m$ and $p(x_i)=1/m$ for each $x_i \in A$. In other words, all observed values of X are different or unique, thus the observations have the highest degree of variety or uncertainty. Hence, RU(X) provides a measure of "randomness" or "uncertainty" of the values that the observed X may take.

In the case of $m > N_X$, RU(X)=1 if and only if $m_i = m/N_X$. Thus $p(x_i)=1/N_X$ for $x_i \in A = X$, i.e., the observed values are uniformly distributed over X. In this case, RU(X) measures the degree of uniformity in the observed values of X. As a general measure of uniformity in the observed values of X, we consider the conditional entropy $H(X|A)$ and conditional relative uncertainty $RU(X|A)$ by conditioning X based on A. Then we have $H(X|A)=H(X)$, $H_{max}(X|A)=\log|A|$ and $RU(X|A)=H(X)/\log|A|$. Hence $RU(X|A)=1$ if and only if $p(x_i)=1/|A|$ for every $x_i \in A$. In general, $RU(X|A) \approx 1$ means that the observed values of X are closer to being uniformly distributed, thus less distinguishable from each other. Whereas $RU(X|A) \ll 1$ indicates that the distribution is more skewed, with a few values more frequently observed. Considering the foregoing, it will be apparent to those skilled in the art that any number of techniques and methods may be used to compute the variability, uniformity or uncertainty in a set of data values and that the present invention is not limited to any particular set of calculations.

FIG. 1 illustrates a network 100 that represents an exemplary environment in which the present invention may be practiced. The system 100 includes network devices 102A -102E (collectively hereinafter, the network devices 102). The network devices 102 may be any devices capable of accessing the network 100 and communicating with the network 100. For example, a portion of the network devices 102 may be computers with network interface capabilities. The system 100 further includes stub networks 104A-104E (collectively hereinafter, the stub networks 104). A stub network is any network that carries packets to and from devices on that network, and the stub networks 104 may be, for example, private enterprise networks. In one embodiment, the stub networks 104 do not carry traffic for other networks, and the stub networks 104 rely on other elements of the network 100 to transport packets among the various stub networks 104 and the network devices 102.

The system 100 also includes a router 106A and a router 106B (collectively hereinafter, the routers 106) that are connected by a link 108. As will be appreciated by those skilled in the art, the link 108 may be considered the backbone of the network 100. The routers 106 may be any routing devices capable of receiving transmitted packets and routing them on to a desired destination. For example, the network device 102A may transmit a group of packets to the network device 102D. These transmitted packets may be received by the router 106A, and the router 106A may cause the packets to traverse the link 108. After receipt by the router 108B, the packets may be delivered to the network device 102D.

Because the network 100 passes traffic between the stub networks 104 in addition to carrying traffic for the network devices 102A, the network 100 may be considered a transit network. As will be appreciated by those skilled in the art, a transit network may carry a very diverse traffic mix. Further, the provider of the network 100 may have minimal knowledge concerning the devices in the stub networks 104 or the traffic being transported on the link 108.

It is important to note that network systems in which the present invention may operate may be arranged in a variety of configurations, and the network 100 of FIG. 1 provides only one exemplary network environment. The network 100 may be a Tier 1 ISP network that provides transit services to smaller ISP networks and to enterprise networks. As a further example, additional routers may be connected to the routers 106 by additional links. Of course, more stub networks and network devices may be interconnected with each of these additional routers. Also, the present invention may be implemented in a network environment that has multiple backbones. The information utilized by the present invention may be gathered by tapping any link on a network. For example, the tapped link may connect a single computer to the network, or the tapped link may be an IP backbone.

Figure 2:
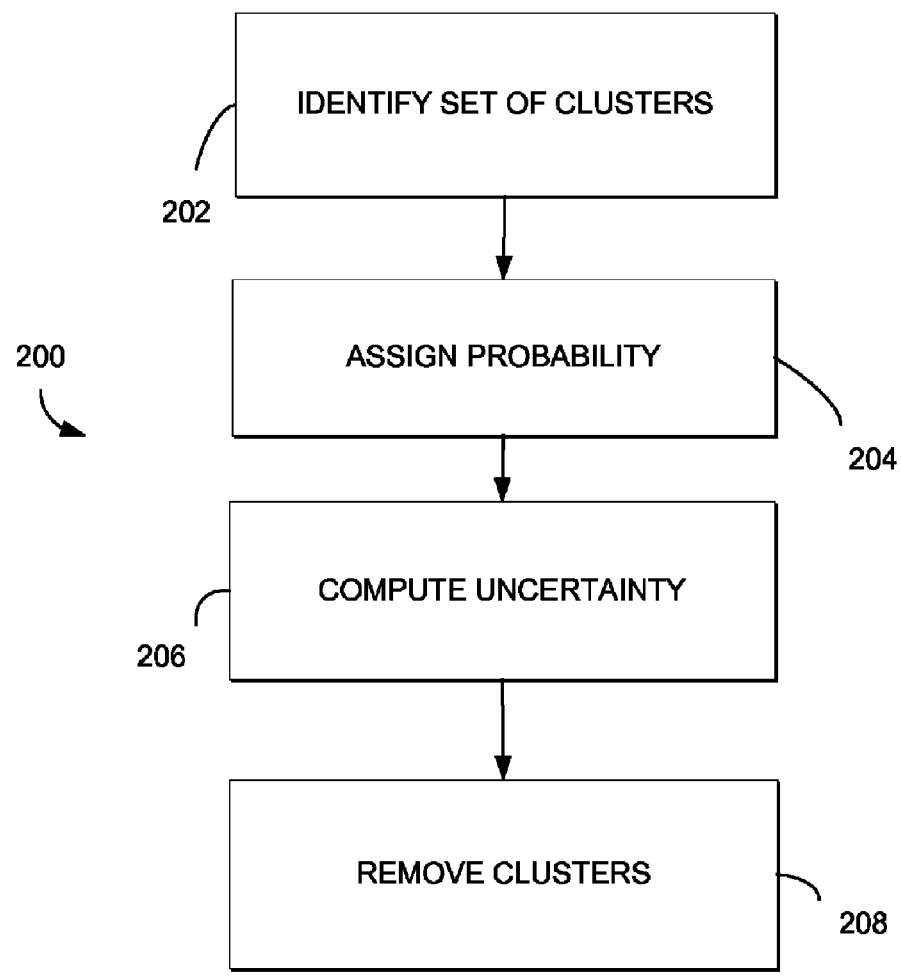
FIG. 2 illustrates a method in accordance with one embodiment of the present invention for identifying significant clusters from traffic traversing a network link.

FIG. 2 illustrates a method 200 for identifying significant clusters from traffic traversing a network link. At a step 202, the method 200 identifies clusters observed traversing the network link. For example, the network link may be tapped by a packet sniffer capable of reading information from the various transmissions traversing the link. Such a packet-sniffing device is well known in the art. The information read from the packets may indicate the source of a transmission, such as the IP address of a source device.

In one embodiment, the packets observed on the link are aggregated into "flows" based on the well-known five-tuple—the source IP address (srcIP), destination IP address (dstIP), source port (srcPrt), destination port (dstPrt), and protocol fields. These attributes may also be described as the dimensions of a flow. Ignoring the protocol fields, each flow may be described with reference to a four-dimensional feature space consisting of srcIP, dstIP, srcPrt and dstPrt. Using this four-dimensional feature space, the method 200 may identify a set of clusters where each cluster is comprised of flows with the same feature value in one of the dimensions. For example, each flow emanating from the same source IP address may be grouped together as a cluster. It should be noted that any of the dimensions (srcIP, dstIP, srcPrt, or dstPrt) may be used to create the clusters. Those skilled in the art will appreciate that the significant srcIP and dstIP clusters will yield a set of "interesting" host behaviors (communication patterns), while the srcPrt and dstPrt clusters will yield a set of "interesting" service/port behaviors, reflecting the aggregate behaviors of individual hosts on the corresponding ports.

At a step 204, the method 200 assigns a probability value to each of the clusters in the set of clusters. The probability value may relate to a property of the clusters. For example, the value may be based on the number of flows in a cluster. Accordingly, if m is the total number of flows observed during a time interval, then $A=\{a_1, \ldots, a_n\}$, $n \geq 2$, may represent the set of clusters. The (induced) probability distribution $P_a$ is given by $p_i := P_a(a_i) = m_i/m$, where $m_i$ is the number of flows that take the value $a_i$ (e.g., having the srcIP $a_i$). Stated another way, in this example, the probability value assigned to each cluster ($p_i$) is the quotient of the number of flows in the cluster ($m_i$) divided by the total number of flows (m). Those skilled in the art will appreciate that any number of different properties may be reflected in the probability value.

At a step 206, an uncertainty value is computed by the method 200. The uncertainty value indicates a level of uncertainty or variability among the probability values assigned to the clusters in the set of clusters. For example, the (conditional) relative uncertainty, $RU(P_A)$ may measure the degree of uniformity in the observed features A. If $RU(P_A)$ is close to 1, then the observed values are close to being uniformly distributed, and are nearly indistinguishable. Otherwise, there are likely feature values in A that "stand out" from the rest. Returning to the volume example, if a few clusters have a large number of flows, while the majority of the clusters have relatively few flows, the few clusters with the large volume of flows will stand out and drive down the value of RU. As previously mentioned, techniques for computing uncertainty or variability values are well known in the art, as well as the techniques for generating the standardized entropy value RU.

The method 200, at a step 208, removes clusters from the set of clusters. In one embodiment, clusters are removed until the uncertainty value for the remaining clusters is equal to or in excess of a desired uncertainty threshold (represented hereinafter as "β"). In this embodiment, each of the removed clusters is identified as a significant cluster. Accordingly, the subset S of A may contain the removed or significant clusters, while the subset R may contain the remaining values of A such that R=A−S. Upon removal of one or more clusters from A, the (conditional) probability distribution on the set of the remaining values (i.e. $RU(P_R)$) may be computed and compared to the uncertainty threshold β. The threshold β may be a value close to 1 (i.e. ~0.9) such that when $RU(P_R)$ is equal to or in excess of β, $P_R$ will approach a uniform distribution. In this case, each cluster having a significant or outlying $p_i$ will reside in subset S, the set of significant clusters. Stated another way, S contains the most significant feature values in A, while the remaining values are nearly indistinguishable from each other.

In one embodiment, the method 200 selects the removed clusters A such that the probability of any value in S is larger than those of the remaining values and such that the (conditional) probability distribution on the set of the remaining values, is close to being uniformly distributed, i.e., $RU(P_R) \geqslant \beta$. In this embodiment, to see what S contains, the feature values of A may be ordered based on their probabilities: let $\hat{a}_1, \hat{a}_2, \ldots, \hat{a}_n$ be such as $P_A(\hat{a}_1) \geq P_A(\hat{a}_2) \geq \ldots P_A(\hat{a}_n)$. Then $S=\{\hat{a}_1, \hat{a}_2, \ldots, \hat{a}_{k-1}\}$ and $R=A-S=\{\hat{a}_k, \hat{a}_{k+1}, \ldots, \hat{a}_{n-1}, \hat{a}_2\}$ where k is the smallest integer such that $RU(P_R) \geqslant \beta$. If $\alpha^* = \hat{a}_{k-1}$, then $\alpha^*$ is the largest "cut-off" threshold such that the (conditional) probability distribution on the set of remaining values R is close to being uniformly distributed.

In one algorithm to determine $\alpha^*$, an appropriate initial value $\alpha_0$ (e.g., $\alpha_0=2\%$) is selected, and the algorithm seeks out the optimal cut-off threshold $\alpha^*$ via "exponential approximation" (reducing the threshold a by an exponentially decreasing factor $\frac{1}{2}^k$ at the kth step). As long as the relative uncertainty of the (conditional) probability distribution $P_R$ on the (remaining) feature set R is less than β, the algorithm examines each feature value in R and includes those whose probabilities exceed the threshold a into the set S of significant feature values. The algorithm stops when the probability distribution of the remaining feature values is close to being uniformly distributed (i.e. greater than or equal to β). Accordingly, the algorithm adaptively adjusts the "cut-off" threshold $\alpha^*$ based on the underlying feature value distributions to extract significant clusters.

Figure 3:
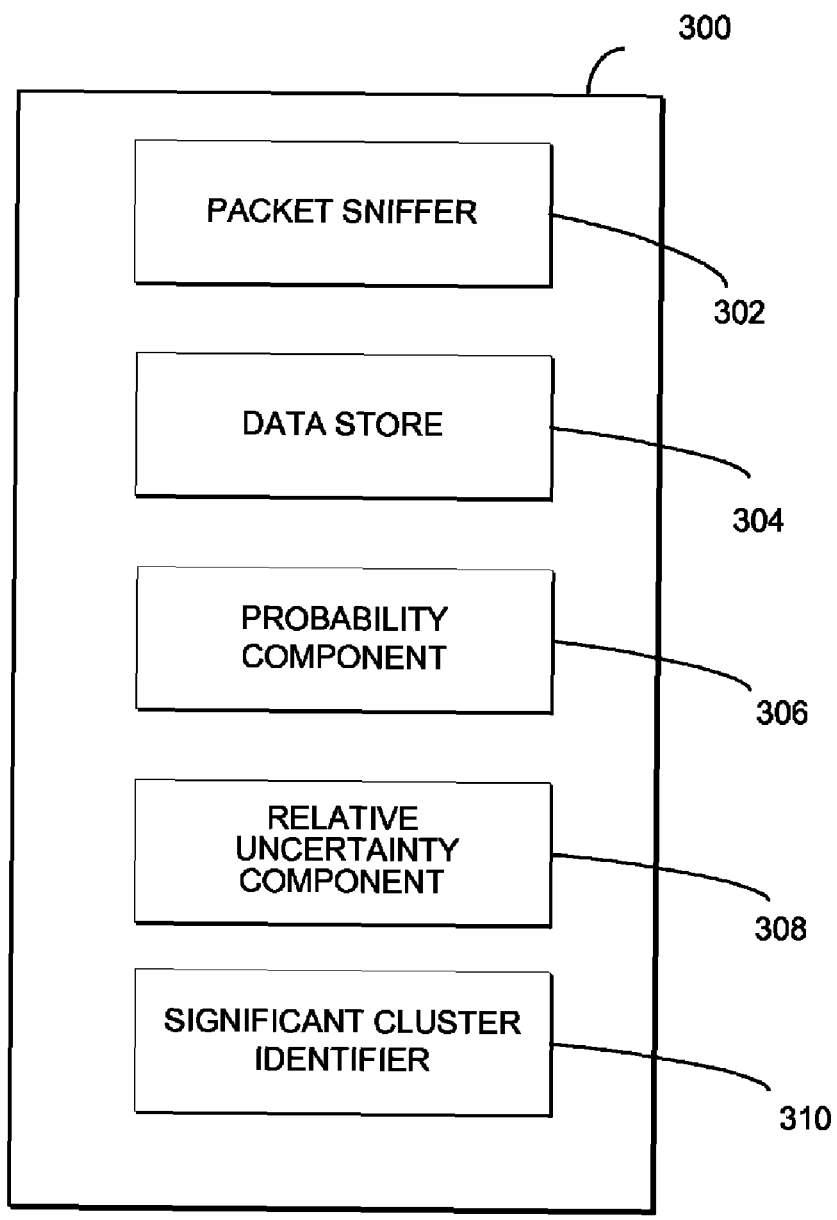
FIG. 3 is a schematic diagram representing a system in accordance with one embodiment of the present invention for identifying clusters exhibiting significant behaviors.

FIG. 3 illustrates a system 300 for identifying clusters exhibiting significant behaviors. The system 300 includes a packet sniffer 302 configured to collect data associated with a set of clusters. A packet sniffer is a device that is able to access a network link and see traffic passing across the link. Any variety of packet sniffers known in the art may be acceptable for use with the present invention, and the packet sniffer 302 may tap a link such as link 108 of the network 100 shown on FIG. 1. As data travels over a network link, the packet sniffer 302 may capture packets and decode information such as the packets' headers. This information may indicate the source IP address and port of a packet, as well as its destination IP address and port. As previously set forth, this information may allow the packets to be divided into flows and into clusters of flows. For instance, each flow emanating from a source port (srcPrt) may be grouped into a cluster. Further, each of these srcPrt clusters may be aggregated into a set of clusters.

The system 300 also includes a data store 304 configured to store information received from the packet sniffer 302. The data store 304 may be any storage media, and the data may be arranged in a variety of different formats. For example, the data may be organized by flows and clusters of flows.

A probability component 306 is included in the system 300. The probability component 306 may be configured to access the data in the data store 304 and to analyze a set of clusters. In one embodiment, the probability component 306 is configured to determine a probability value for each cluster in the set of clusters. The probability value may vary based on a characteristic of a cluster, such as the number of flows in a cluster. In one embodiment, the probability value is the number of flows in a cluster divided by the total number of flows. In this example, a cluster with a large number of flows is assigned a large probability value, while a cluster with only a few flows receives a smaller probability value.

The system 300 also includes a relative uncertainty component 308 configured to receive the probability values and to generate an uncertainty value for the set of clusters. The uncertainty value indicates the level of uncertainty among the probability values of the set's clusters. As previously discussed, when the probability values approach a uniform distribution, the relative uncertainty value for the set approaches a value of one. In one embodiment, each time one or more clusters are removed from the set, the relative uncertainty component 308 considers the remaining clusters and updates the uncertainty value for the set.

A significant cluster identifier 310 is also included in the system 300. The significant cluster identifier 310 is configured to remove significant clusters from the set of clusters. In one embodiment, the significant cluster identifier 310 removes significant clusters until the uncertainty value of the remaining set is equal to or in excess of a desired uncertainty threshold. For example, if the probability value is related to the number of flows in a cluster, the significant cluster identifier 310 may first mark the clusters having the most flows as significant and remove those clusters from the set of clusters. Subsequently, the significant cluster identifier 310 may continue to remove the largest remaining clusters from the set until the relative uncertainty for the set is equal to or in excess of the desired uncertainty threshold. Of course, the relative uncertainty component 308 may be utilized throughout this removal process to update the uncertainty value for the remaining set. Those skilled in the art will recognize that, by removing the clusters with the largest number of flows, the remaining set will become more and more uniform, and thus, its RU value will approach a threshold close to one. Once the RU value of the remaining set obtains the threshold, removal of clusters by the significant cluster identifier 310 may cease, and the removed clusters may be deemed to exhibit significant behaviors and be marked for further analysis.

Figure 4:
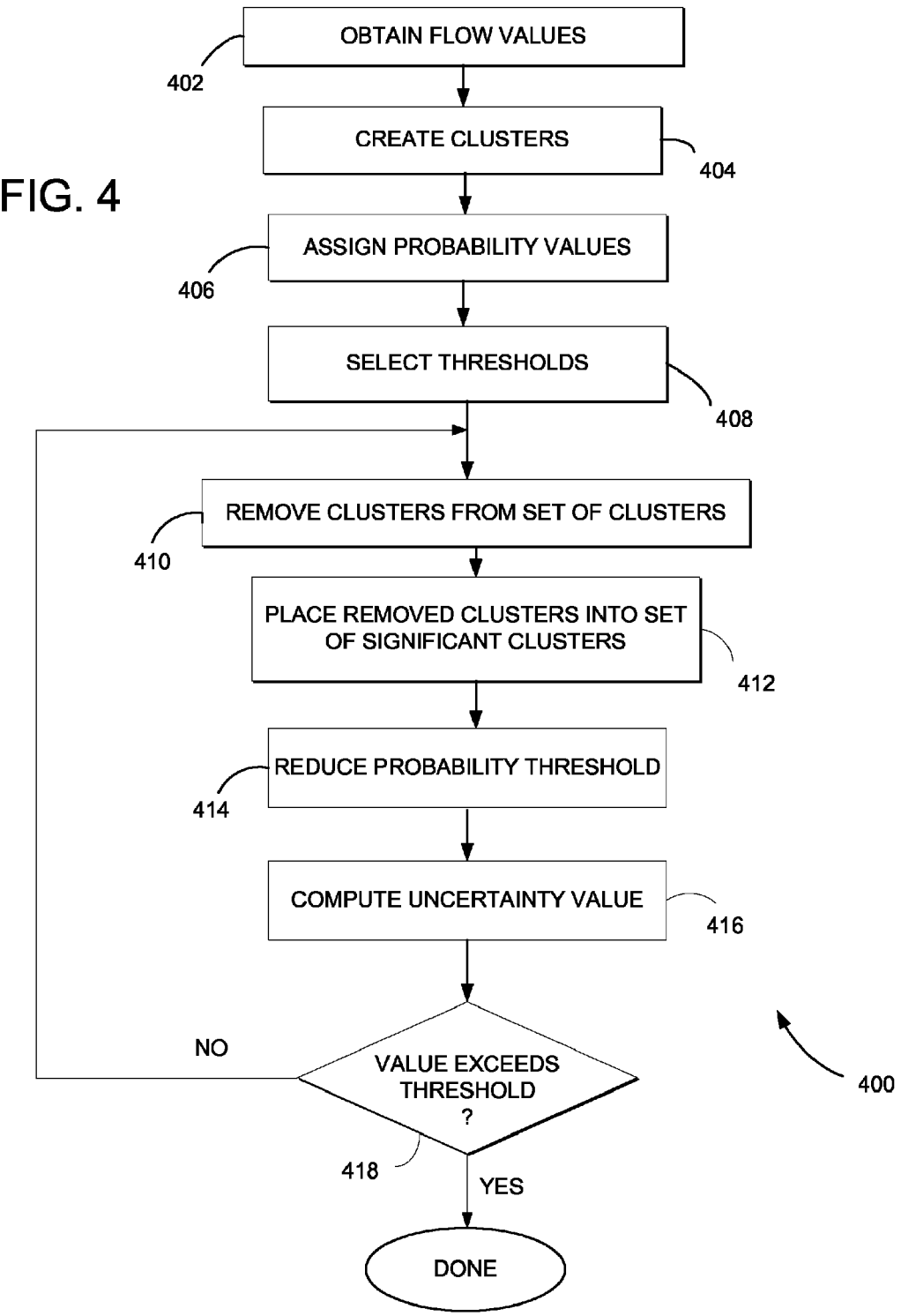
FIG. 4 illustrates a method in accordance with one embodiment of the present invention for identifying a set of significant clusters from traffic on a computer network.

FIG. 4 illustrates a method 400 for identifying a set of significant clusters from traffic on a computer network. At a step 402, the method 400 obtains values associated with flows traversing a link on the computer network. These values may correspond to flow dimensions such as srcIP, dstIP, srcPrt, and dstPrt. At a step 404, the method 400 creates clusters of flows by grouping together flows that share a common dimension. Each of these clusters may be referred to as a set of clusters. For example, if 100 distinct destination addresses are found in the observed flows, then the flows may be divided into 100 clusters (one for each dstIP). These 100 dstIP clusters may be grouped together as the set of clusters.

The method 400, at a step 406, assigns a probability value to each cluster. The probability value may relate to an aspect of a cluster, such as its volume. By basing the probability value on the volume of flows in a cluster, the significant clusters will be identified based on volume—the larger the volume of a cluster, the more likely it will be identified as a significant cluster. Those skilled in the art will appreciate that any property of a cluster may be selected for use with the probability value and that the significant clusters will be selected in accordance with the selected property.

At a step 408, the method 400 selects a probability threshold and an uncertainty threshold. The probability threshold indicates a probability where clusters above the probability threshold are deemed to be significant. As will be discussed, the probability threshold is downwardly adjusted throughout the performance of the method 400. Accordingly, the initial value of the probability threshold may be selected such that relatively few clusters have a probability value in excess of the threshold. Such an initial value may be selected with reference to the probability values or to historical data. The uncertainty threshold is a target level of uncertainty. The uncertainty threshold should indicate a uniform distribution such that when the threshold is achieved, no significant clusters remain in the set. To this end, in one embodiment, the uncertainty threshold is set to 0.9.

The method 400, at a step 410, removes from the set of clusters each cluster that is assigned a probability value above the probability threshold, and the removed clusters are placed into a set of significant clusters at a step 410. As these clusters have outlying probability values, they may be marked as significant. As will be discussed, various further analyses may be conducted to profile these significant clusters.

At a step 414, the method 400 decreases the probability threshold. Any level of decrease may be appropriate. For example, the threshold may be decreased by an experientially decreasing factor, or the threshold may be decreased by a constant value.

The method 400, at a step 416, computes an uncertainty value indicating a level of uncertainty among the probability values assigned to the remaining clusters. As previously set forth, the RU value relates to the uniformity or variability of the probability values associated with the set's clusters.

At a step 418, the method 400 determines whether the uncertainty value exceeds the uncertainty threshold. When the value does not exceed the threshold, the method 400 repeats the steps 410-416. Such iteration is necessary to remove additional, significant clusters from the set of clusters; by continuing to remove the outlying clusters, the uniformity of the remaining clusters will increase and the uncertainty value will eventually exceed the threshold. As the step 414 decreases the probability threshold every iteration, additional clusters become subject to removal at the step 410. Once, the uncertainty value exceeds the uncertainty threshold, the method 400 may cease performance and the set of significant clusters may be considered complete.

Figure 5:
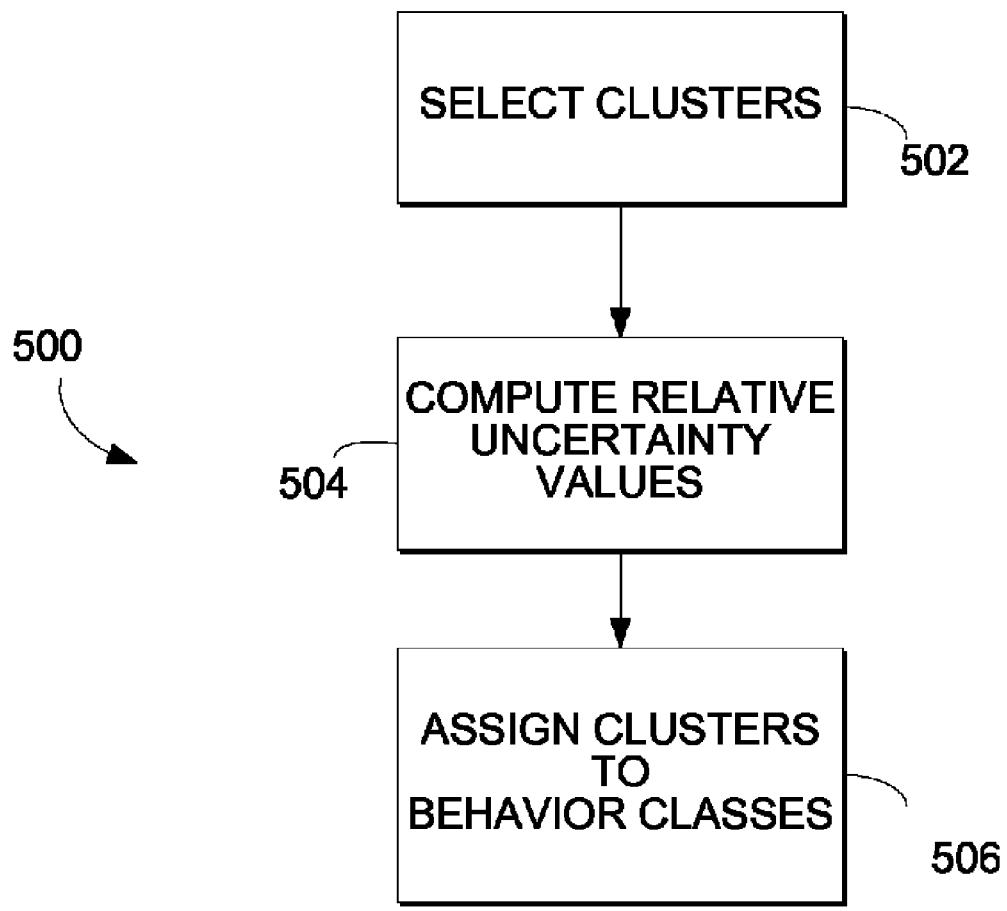
FIG. 5 illustrates a method in accordance with one embodiment of the present invention for profiling traffic on a computer network.

FIG. 5 illustrates a method 500 for profiling traffic on a computer network. At a step 502, the method 500 selects a plurality of clusters for analysis and profiling. In selecting these clusters, methods such as the previously discussed method 200 and the method 400 may be performed. However, any selection process may be used by the method 500 to select clusters, and the present invention is not limited to consideration of certain types of clusters.

The method 500, at a step 504, computes relative uncertainty values for each of the clusters, and these relative uncertainty values indicate a degree of variability in the cluster for the flow dimensions. For example, the step 504 may compute values indicating the RU in a srcIP cluster for the dimensions of dstIP, srcPrt, and dstPrt. Continuing this example, a set of srcIP clusters may be extracted from flows observed in a given time slot. Because the flows in each cluster share the same srcIP address, this dimension may be referred to as the "cluster key." Further the other three dimensions (dstIP, srcPrt, and dstPrt) may take any possible values and may be referred to as "free" dimensions. Hence, the flows in a cluster induce a probability distribution on each of the three "free" dimensions, and a relative uncertainty measure can be defined for each. Stated another way, for each cluster extracted along a fixed dimension, the variables X, Y and Z may denote its three "free" dimensions. Hence for a srcIP cluster, X, Y, and Z denote the srcPrt, dstPrt and dstIP dimensions, respectively. This cluster may be characterized by an RU vector [$RU_X$, $RU_Y$, $RU_Z$]. Accordingly, in one embodiment, the method 500 generates an RU vector containing an RU value for each free dimension.

At a step 506, the method 500 assigns clusters exhibiting similar behaviors to the same behavior class. The RU values may be divided into any number categories, and, in general, with N categories, the number of behavior classes will be $3^N$. In one embodiment, to group clusters with similar behaviors, each RU dimension is divided into three categories: low, medium and high. Low RU values are represented with a 0, medium represented with a 1, and high RU values represented with a 2. Applying this labeling concept, a label L(ru) may take the form:

$$L(ru) = \begin{cases} 0 \text{ (low)}, & \text{if } 0 \leq ru \leq e \\ 1 \text{ (medium)}, & \text{if } e < ru < 1-e \\ 2 \text{ (high)}, & \text{if } 1-e \leq ru \leq 1 \end{cases}$$

For example, a srcIP cluster may have a high degree of relative uncertainty for the srcPrt and dstPrt dimensions, but a very low uncertainty for the dstIP dimension. This cluster may be characterized by a vector L(ru)=[2, 2, 0].

Using this labeling process, $3^3$ or 27 different possible values for L(ru) are possible, and each cluster having the same L(ru) vector will exhibit similar behaviors. Accordingly, these 27 L(ru) vectors may be used to divide the clusters into 27 behavior classes. As will be appreciated by those skilled in the art, the L(ru) vector may be considered the behavioral profile of a behavior class—the L(ru) vector indicates a degree of variability in the flow dimensions shared by the member clusters of the class. Those skilled in the art will further recognize that any number of behavior classes may be created by the present invention and that clusters having similar RU vectors may be combined with any number of techniques to create the behavior classes.

Figure 6:
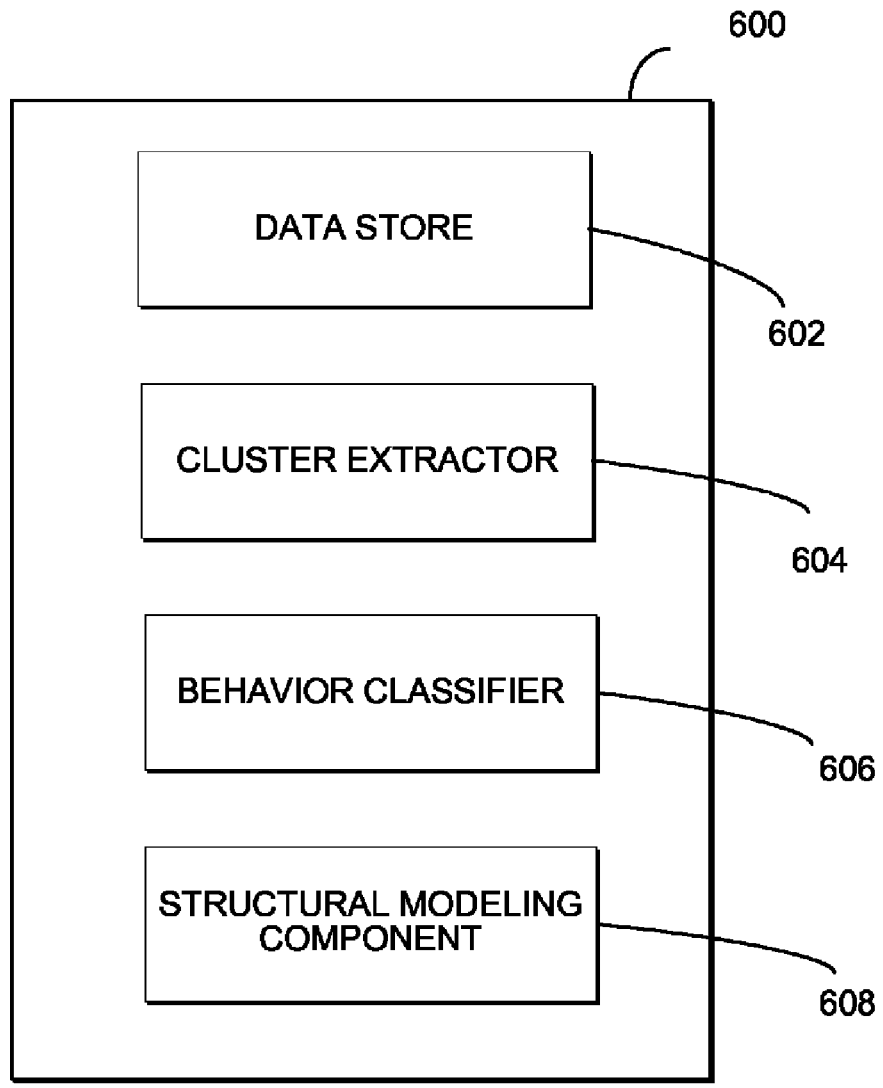
FIG. 6 is a schematic diagram representing a system in accordance with one embodiment of the present invention for profiling flows traversing a network link.

FIG. 6 illustrates a system 600 for profiling flows traversing a network link. The system includes a data store containing values associated with flows observed on the link. These values may indicate the source IP address and port of a flow, as well as its destination IP address and port. A cluster extractor 604 may utilize these values to group the flows into clusters and to select clusters for further analysis (i.e. profiling). While any selection algorithm may be implemented by the cluster extractor 604, in one embodiment, only significant clusters exhibiting behaviors of interest are selected by the clusters extractor 604.

The system 600 also includes a behavior classifier 606 configured to assign each of the clusters to a behavior class. Each behavior class may be assigned an associated behavioral profile indicating a degree of variability for various flow dimensions. For example, one behavior class may have a profile indicating a high level of variability for the dstIP dimension, but low variability for the srcPrt and dstPrt dimensions. Accordingly, each cluster exhibiting this pattern of variability will be assigned to this behavior class by the behavior classifier 606. In one embodiment, the behavior profile specifies a range of relative uncertainty values for each free dimension, and the behavior classifier 606 computes relative uncertainty values for each free dimension of a cluster. These relative uncertainty values are then compared to the ranges of relative uncertainty values associated with the behavior classes to determine which class a cluster should be placed.

The behavior classifier 606 may optionally be configured to track temporal properties of the behavior classes (hereinafter "BC"s). For example, the behavior classifier 606 may capture different aspects of the characteristics of the BC's over time. These aspects include the popularity, i.e., the number of times a particular BC appears (at least one cluster belonging to the BC is observed). The average number of clusters belonging to a given BC may be tracked, as well as the membership volatility. The volatility measure indicates whether a given BC tends to contain the same clusters over time (i.e., the member clusters re-appear over time). Those skilled in the art will recognize that the behavior classes defined by the RU-based behavior classification scheme may manifest distinct temporal characteristics, as captured by the frequency, populousness and volatility metrics. Accordingly, the behavior classifier 606 may track these characteristics.

The behavior classifier 606 may also optionally be configured to track the behavior characteristics of individual clusters over time. In particular, the behavior classifier 606 may be configured to determine a relation between the frequency of a cluster (i.e., how often it is observed) and the behavior class(es) it appears. Further the behavior classifier 606 may also track the behavior stability of a cluster if it appears multiple times, namely, whether a cluster tends to re-appear in the same BC or different BCs. Those skilled in the art will appreciate that clusters (especially those frequent ones) may exhibit consistent behaviors over time and that the RU-based behavior classification scheme may capture certain behavior similarity among clusters.

The system 600 also includes a structural modeling component 608. The structural modeling component 608 may be configured to determine dominant states for the clusters. Dominant state analysis provides technique for modeling and characterizing the interaction of features within a cluster. For instance, given a srcIP cluster, all flows in the cluster can be represented as a 4-tuple (ignoring the protocol field) $\{u, x_i, y_i, z_i\}$, where the srcIP has a fixed value u, while the srcPrt (X dimension), dsrPrt (Y dimension) and dstIP (Z dimension) may take any legitimate values. Hence, each flow in the cluster imposes a "constraint" on the three "free" dimensions X, Y and Z. Treating each dimension as a random variable, the flows in the cluster constrain how the random variables X, Y and Z "interact" or "depend" on each other, via the (induced) joint probability distribution P(X, Y, Z). The objective of dominant state analysis is to explore the interaction or dependence among the free dimensions by identifying "simpler" subsets of values or constraints (called structural models) to represent or approximate the original data in their probability distribution. These subsets may be referred to as dominant states of a cluster. Hence, given the information about the dominant states, the original distribution may be reproduced with reasonable accuracy. For example, suppose a srcIP cluster consisting mostly of scans (with a fixed srcPrt 220) to a large number of random destinations on dstPrt 6129. Then the values in the srcPrt, dstPrt and dstIP dimensions these flows take are of the form {220, 6129, *}, where * (wildcard) indicates random or arbitrary values. Clearly this cluster belongs to srcIP BC [0,0,2], and the cluster is dominated by the flows of the form {220, 6129, *}. Hence the dominant state of the cluster is {220, 6129, *}, which approximately represents the nature of the flows in the cluster, even though there might be a small fraction of flows with other states. Those skilled in the art will appreciate that any number of techniques may be utilized to determine the dominant states of a cluster.

Figure 7:
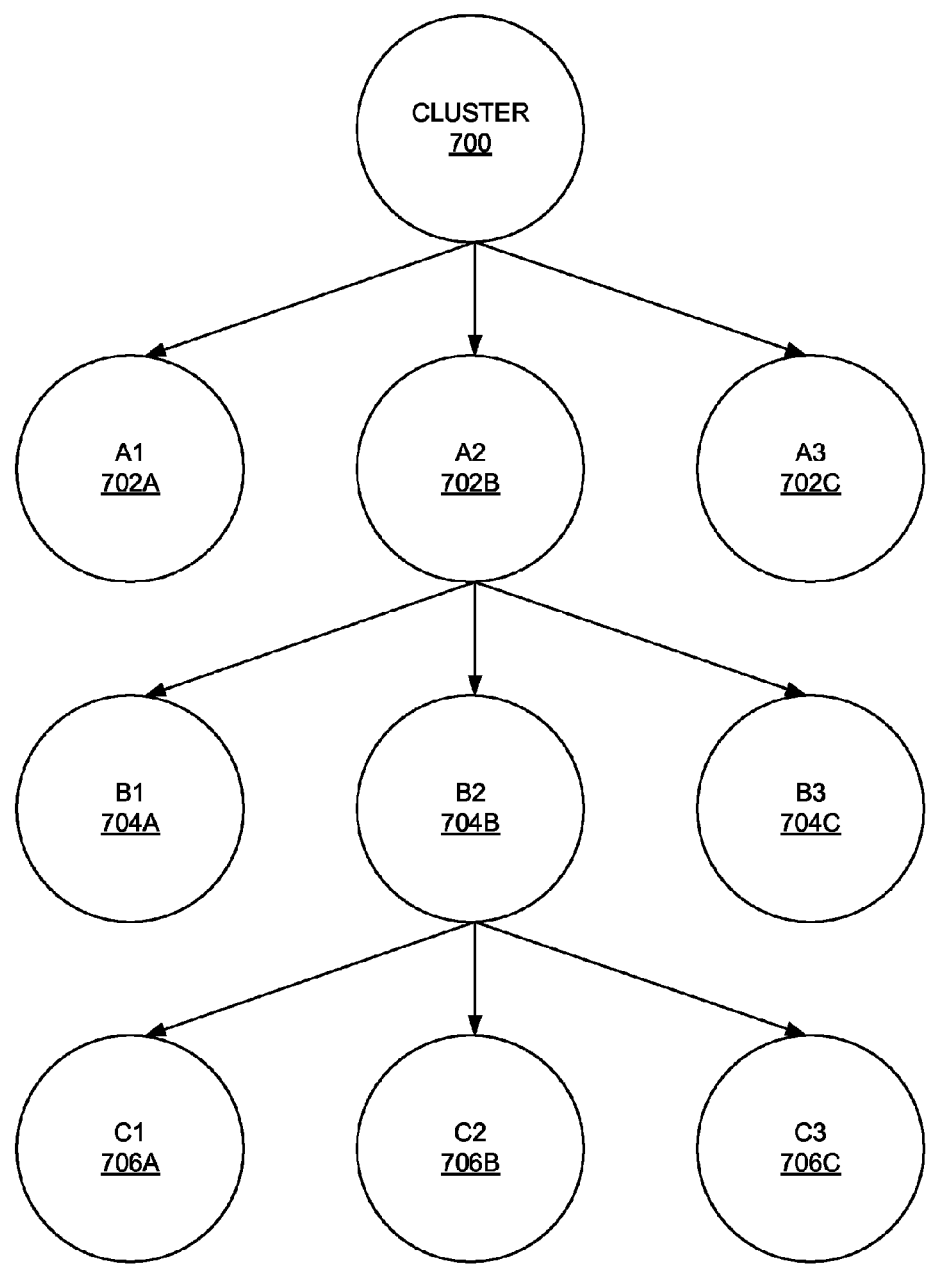
FIG. 7 is a schematic diagram illustrating a process for identifying dominant states of a cluster in accordance with one embodiment of the present invention.

FIG. 7 is a diagram of a cluster 700 illustrating a process for identifying dominant states of the cluster 700. If {A,B,C} is a re-ordering of the three free dimensions X, Y, Z of the cluster based on their RU values, then A is the free dimension with the lowest RU, B the second lowest, and C the highest. To find the dominant states of the cluster 700, the procedure finds the substantial values in the dimension A. A specific value a in the dimension A is substantial if the marginal probability $p(a):=\Sigma_b \Sigma_c p(a, b, c) \geq \delta$, where $\delta$ is a threshold for selecting substantial values. In FIG. 7, a state 702A, for example, represents a state of the cluster 700 where the dimension A has a substantial value A1. Similarly, a state 702B has a substantial value in A of A2, and a state 702C has a substantial value of A3. If no such substantial value exists, there are no dominant states and the process stops.

When substantial values such as A1, A2 and A3 exist, the "dependence" between the dimension A and dimension B may be explored by computing the conditional (marginal) probability of observing a value $b_j$ in the dimension B given $a_i$ in the dimension A: $p(b_j|a_i):=\Sigma_c p(a_i, b_j, c)/p(a_i)$. These substantial $b_j$'s exist when $p(b_j|a_i) \geq \delta$. Stated another way, the process finds substantial values in B given each substantial value a. For example, for the substantial value A2 (i.e. the state 702B), the substantial values B1-B3 may be identified along with their respective states 704A-704C. Further, if no substantial value exists for a given a, the procedure stops.

When states having dominant values for a and b (e.g. the states 704A-C), the process seeks substantial values in C given each $a_i$, $b_j$. The process computes the conditional probability, $p(c_k|a_i, b_j)$, for each $a_i$, $b_j$ to find those substantial $c_k$'s, such that $p(c_k|a_i, b_j) \geq \delta$. The states 706A-706B represents flows having such values of c, i.e., C1, C2 and C3. Upon completion, the dominant state process produces a set of dominant states of the following forms: (*,* ,*) (i.e., no dominant states), or $a_i \rightarrow (*,*)$, $a_i \rightarrow b_j \rightarrow *$, or $a_i \rightarrow b_j \rightarrow c_k$. As will be appreciated by those skilled in the art, the set of dominant states is an approximate summary of the flows in the cluster, and it captures the "most information" of the cluster. Accordingly, the set of dominant states of a cluster provides a compact representation of the cluster.

Figure 8:
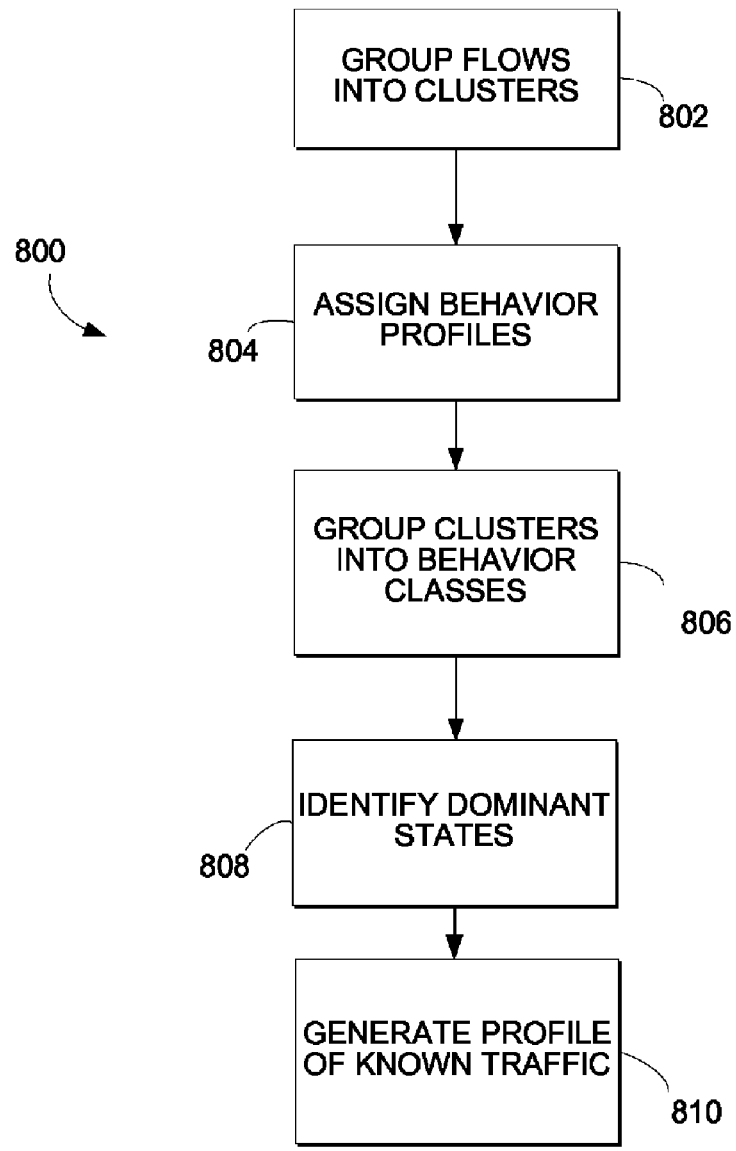
FIG. 8 illustrates a method in accordance with one embodiment of the present invention for interpreting flows of network traffic.

FIG. 8 illustrates a method for interpreting flows of network traffic. At a step 802, the method 800 groups flows into clusters. As previously discussed, each flow sharing a common dimension may be grouped together. For example, flows with the same source port may be grouped together as a cluster.

The method 800, at a step 804, assigns a behavior profile to at least a portion of the clusters. Each cluster may receive a behavior profile, or only clusters exhibited significant behavior may be selected for profiling. The behavior profile may indicate a degree of variability for the flow dimensions, and the behavior profile may take a variety of different forms. For example, an RU value may be computed for each free dimension. This set of RU values will indicate how much variability exists in a cluster for each dimension. Further, the set of RU values may be reduced to a set of labels indicating degrees of uncertainty. For example, each RU value between 0 and 0.33 may be labeled as 0 indicating low uncertainty. Similarly, RU values from 0.34-0.66 may be labeled as 1 indicating medium uncertainty, while RU values from 0.67 to 1 may be labeled as 2 for high uncertainty. Accordingly, the set of RU values may be represented with these labels. Those skilled in the art will recognize that any number of labeling metrics may be appropriate for the present invention.

At a step 806, the method 800 divides the clusters into behavior classes by grouping together clusters with similar behavior profiles. For example, each cluster having the same set of labels may be placed together in a behavior class. More generally, a behavior class may be comprised of each cluster having similar levels of RU for each of the free dimensions. Those skilled in the art will recognize that any number of behavior classes may be appropriate for the present invention and that numerous techniques exist in the art to compare the similarity of behavior profiles and to group clusters having similar profiles.

The method 800, at a step 808, identifies one or more dominant states describing the flows in each of the clusters. As previously explained, the dominant states of a cluster provide a compact representation of the cluster. Further the dominant states of the cluster approximately represent the nature of the flows in the cluster, even though there might be a small fraction of flows with other states. Those skilled in the art will appreciate that any number of techniques, such as the process illustrated by FIG. 7, may be utilized to determine the dominant states of a cluster.

Beyond identifying dominant states, the method 800 may also consider additional features (beyond the four basic dimensions srcIP, dstIP, srcPrt and dstPrt) to identify similarities among clusters within a BC and to distinguish subclasses of behaviors within a BC. Examples of additional features that may be considered are cluster sizes (defined in total flow, packet and byte counts), average packet/byte count per flow within a cluster and variability.

At a step 810, the method 800 generates a profile characterizing well-known traffic patterns on the network. This profile of the network traffic associates behavior classes and dominant states with well-known traffic patterns. For example, a majority of the significant clusters in a network may fall into three "canonical" profiles: typical server/service behavior (mostly providing well-known services); typical "heavy-hitter" host behavior (predominantly associated with well-known services); and typical scan/exploit behavior (frequently manifested by hosts infected with known worms). The canonical behavior profiles may be characterized by key aspects including: (i) BCs and the properties of these classes, (ii) temporal characteristics (frequency and stability) of individual clusters, (iii) dominant states, and (iv) additional attributes such as average flow size in terms of packet and byte counts and their variability.

The profile created at the step 810 may be used to identify anomalous behaviors in the clusters; clusters with behaviors that differ in one or more aspects from the canonical profiles present themselves as more interesting and as warranting closer examination. Indeed, interesting or anomalous behaviors may be found using the profile by either identifying i) novel or unknown behaviors that match the typical server/service profile, heavy-hitter host profile, or scan/exploit profile, but exhibit unusual feature values, as revealed by analyses of their dominant states or ii) deviant or abnormal behaviors that deviate significantly from the canonical profiles in terms of BCs (e.g., clusters belonging to rare BCs), temporal instability (e.g., unstable clusters that jump between different BCs), or additional features.

One well-known traffic pattern that may be profiled by the method 800 is a server/service behavior profile. For example, a typical server providing a well-known service may show up in either the popular, large and non-volatile srcIP BCs or dstIP BCs. Such BCs may represent the behavior patterns of a server communicating with a few, many or a large number of hosts. Similarly, considering the srcPrt and dstPrt perspectives, the clusters associated with the well-known service ports are expected to generally belong to the same BC's, e.g., either srcPrt BC [2,1,2] or dstPrt BC [2,2,1], representing the aggregate behavior of a (relatively smaller) number of servers communicating with a much larger number of clients on a specific well-know service port. Those skilled in the art will appreciate that, in terms of their temporal characteristics, the individual clusters associated with servers/well-known services will tend to have a relatively high frequency, and almost all will be stable and will re-appear in the same or akin BCs. Further, the average flow size (in both packet and byte counts) of the clusters may show high variability—each cluster typically will consists of flows of different sizes.

Another canonical behavior profile may be referred to as the heavy-hitter host profile. This profile represents hosts (typically clients) that send a large number of flows to a single or a few other hosts (typically servers) in a short period of time (e.g., a 5-minute period). Those skilled in the art will recognize that this profile may include the popular and non-volatile srcIP BC [2,0,0] or BC [2,0,1], and/or the dstIP BC [0,2,0] and BC [0,2,1]. The heavy-hitter host profile may also include clusters that are stable with varied frequencies. These heavy-hitter clusters may also typically be associated with well-known service ports (as revealed by the dominant state analysis), and may contain flows with highly diverse packet and byte counts. For instance, it is expected that many of the heavy-hitter hosts correspond to NAT boxes (many clients behind a NAT box making requests to a few popular web sites, making the NAT box a heavy hitter), web proxies, cache servers or web crawlers.

Another canonical behavior profile may describe behaviors of hosts performing scans or attempting to spread worms or other exploits. Two signs of typical scan/exploit behavior are i) clusters tending to be highly volatile (i.e. appearing and disappearing quickly) and ii) a majority of the flows in the clusters contain one or two packets with fixed size. For example, the profile may indicate that, if most of the flows using TCP protocol in these clusters are failed TCP connections on well-known exploit ports, then such clusters are likely associated with scanning or exploit activities. Those skilled in the art will appreciate that the present profiling techniques are capable of automatically picking out clusters that fit the scan/exploit behavior profile, despite unknown feature values. This capability will enable network operators/security analysts to examine novel, hitherto unknown, or "zero-day" exploits.

Beyond identifying novel or anomalous behaviors that fit the canonical profiles, the method 800 may also identify rare behaviors or deviant behaviors that are worthy of deeper inspection. For example, clusters in the rare behavior classes, by definition, represent atypical behavioral patterns. For example, if three dstPrt clusters suddenly appear in a rare dstPrt BC in several different time slots, and quickly vanish within one or two time slots, then closer examination may be warranted to explain this rare behavior. As another example, clusters that exhibit unstable behaviors such as suddenly jumping between BCs (especially when a frequent cluster jumps from its usual BC to a different BC) often signify anomalies. Such behavior is suspicious and provides an illustration of how fundamental shifts in communication patterns can point a network security analyst to genuinely suspicious activities. As a final example, clusters associated with common service ports that exhibit behaviors that do not fit their canonical profiles may be of concern because these ports are typically not blocked by firewalls.

Figure 9:
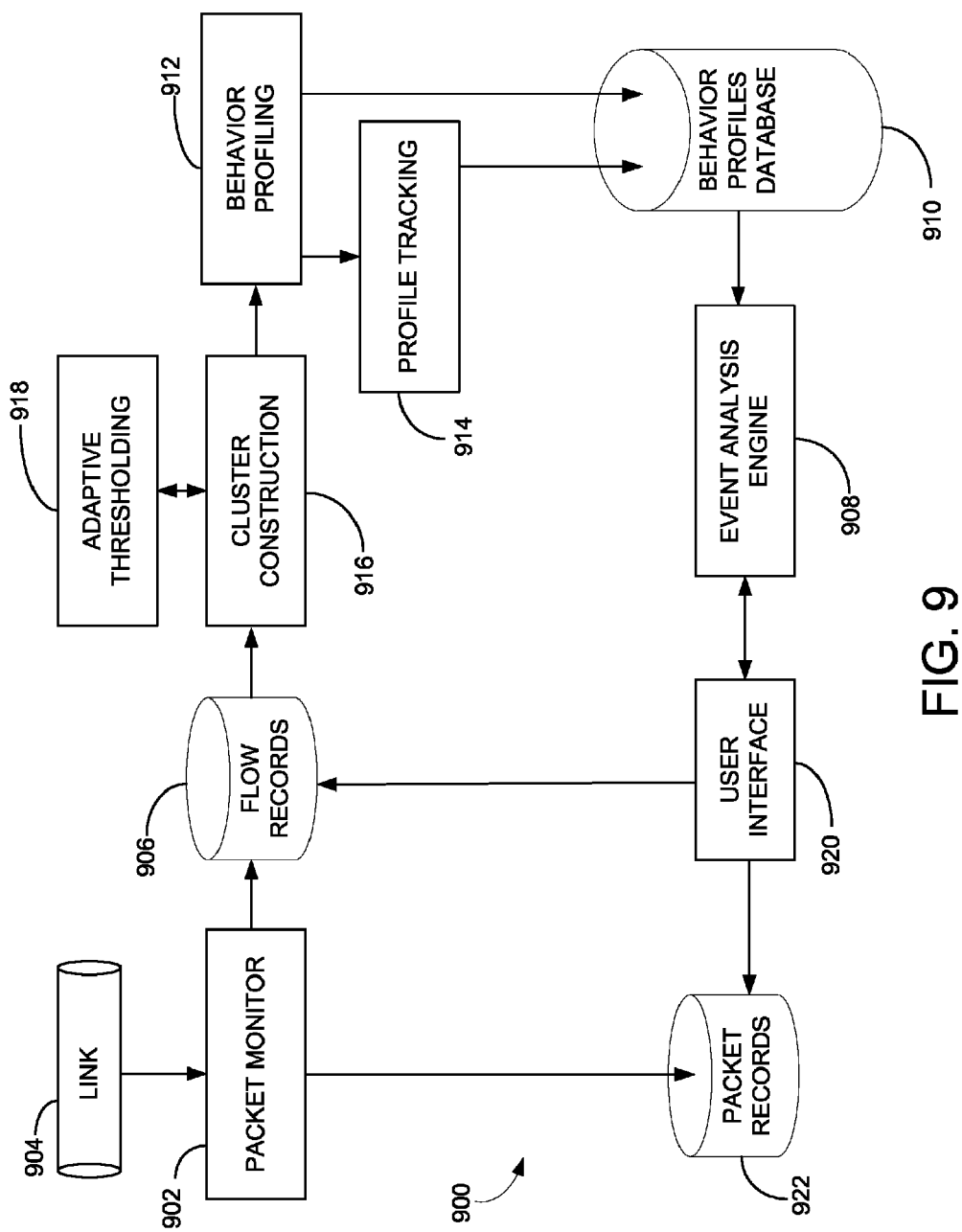
FIG. 9 is a schematic diagram illustrating a system for profiling flows of network traffic in accordance with one embodiment of the present invention.

FIG. 9 is a diagram of a profiling system 900 for profiling flows of network traffic.

In one embodiment, there are four considerations reflected in the architecture of the system 900. First, the profiling system 900 may be designed to be scalable. The system 900 may be targeted at high-speed (1 Gbps or more) backbone links and, hence, must scale to the traffic load offered by such links. In this embodiment, if the system 900 has to continuously build behavior profiles of significant clusters once every time interval T, then it has to take less than time T to process all the flow records aggregated in every time interval T.

The profiling system 900 may also be designed to be robust enough to handle anomalous traffic patterns, such as those caused by denial of service attacks, flash crowds, worm outbreaks, etc. These traffic patterns can place a heavy demand on system resources. At the same time, it may be important for the profiling system 900 to be functioning during such events since it will generate data for effective response and forensic analysis. Therefore, the system 900 may adapt to these situations and achieve a suitable balance between profiling accuracy and resource utilization.

The profiling system 900 may be designed in a modular fashion with each module encapsulating a specific function or step in the profiling methodology. Information exchange between modules may be clearly specified. In addition, the system 900 may be designed to accept input from any packet or flow monitoring system that exports a continuous stream of flow records.

Further, the profiling system 900 may be designed to be easily configured and customized so that a network operator can focus on specific events of interest and obtain varying levels of information about these events. At the same time, the system 900 may expose minimal details about the methodology to an average user. Finally, the system 900 may generate meaningful and easy-to-interpret event reports, instead of streams of statistics.

Turning to the overall architecture of the real-time profiling system 900, the flow-level information used by the profiling system 900 is generated from a continuous packet monitoring component 902, which captures packet headers on a high-speed Internet link 904. This capturing may be performed, for example, via an optical splitter and a packet-capturing device, i.e., a DAG card. The monitoring component 902 aggregates packets into 5-tuple flows and exports the flow records for a given time interval into a flow record file 906. In general, the profiling system 900 obtains flow records through at least one of three ways: i) shared disk access; ii) file transfer over socket; and iii) flow transfer over a streaming socket.

In one embodiment, the system 900 carries out multiple tasks in parallel over distinct process threads to improve efficiency. For example, one thread may continuously read flow records in the current time interval $T_i$ from the monitoring component 902, while another thread profiles flow records that are complete for the previous time interval $T_{i-1}$.

The real-time traffic profiling system 900 includes four functional modules, namely, a cluster construction module 916, an adaptive thresholding module 918, a behavior profiling module 912 and a profile tracking module 914. Each of these modules implements one step of the previously discussed traffic profiling methodology.

An event analysis engine 908 is also included in the system 900. The engine 908 analyzes a behavior profile database 910, which includes current and historical behavior profiles of end hosts and network applications reported by the behavior profiling module 912 and the profile tracking module 914.

The cluster construction module 916 may have two initialization tasks. First the cluster construction module 916 may load a flow table (FTable) in a time interval T into memory from the flow record file 906 once the profiling system 900 receives a signal indicating the FTable is ready. The second task of the cluster construction module 916 may be to group flows in the FTable associated with the same feature values (i.e., cluster keys) into clusters. The adaptive thresholding module 918 may be utilized to analyze the distribution of flow counts in the four feature dimensions and to compute a threshold for extracting significant clusters along each dimension. The behavior profiling module 912 may implement a combination of behavior classification and structural modeling that builds behavior profiles in terms of communication patterns of significant end hosts and applications. Finally, the profile tracking module 914 may examine behavior profiles to find interesting and suspicious network events.

Optionally, the system 900 may include a user interface 920 for displaying event reports and for receiving rule configurations. Also, the user interface 920 may allow for forensic analysis to be performed with respect to a packet record file 922 received from the packet monitoring component 902.

Because high-speed backbone links typically carry a large amount of traffic flows, efficiently storing and searching these flows may be important for the scalability of the real-time profiling system 900. In one embodiment, two data structures, namely the FTable and the CTable, are used for efficient storage and fast lookups during cluster extraction and behavior modeling.

The FTable, an array data structure, provides an index of 5-tuple flows. For example, the index may be provided through a commonly used hash function, FH=srcip^dstip^srcport^dstport^proto% (FTableEntries−1), where FTableEntries denotes the maximum entries of FTable. For example, a flow may be mapped to an entry in the FTable. In case of hashing collision, i.e., two or more flows mapping to the same table entry, a linked list may be used. While constructing clusters, one approach may be to make four copies of 5-tuple flows, and then group each flow into four clusters along each dimension. However, this method may dramatically increase the memory cost of the system since the flow table typically has hundreds or millions of flows in each time interval. Instead of duplicating flows, which is expensive, four flow pointers (i.e., next srcIP, next dstIP, next srcPrt, and next dstPrt) may be added to each flow. Each flow pointer may link the flows sharing the same feature value in the given dimension.

To address the question of how to quickly find the "old" flows of the same clusters when adding a new flow in the flow table, another data structure may be created. This structure, known herein as the CTable, may link the first flow of each cluster in the FTable. Since there are four types of clusters, four instances of the CTable are created for managing clusters along four dimensions. Considering srcPrt and dstPrt dimensions with 65536 possible clusters (ports), an array with a size of 65536 may be used to manage the clusters for each of these two dimensions. The index of the array for each port is the same as the port number. For srcIP and dstIP dimensions, a simple hash function may be used. For example, this function may perform a bitwise exclusive OR (XOR) operation on the first 16 bits and the last 16 bits of IP address to map each srcIP or dstIP into its CTable entry. When adding a new flow, for each given dimension value, the first flow of the corresponding cluster is located and the corresponding pointer of the new flow is set to the first flow. Subsequently, the first flow of the corresponding cluster is updated to the new flow.

In addition to point to the first flow in each cluster, each CTable entry also includes flow count for the cluster and significant bit for marking significant clusters. The former maintains flow counts for cluster keys. As previously discussed, the flow count distribution will determine the adaptive threshold for extracting significant clusters.

The space and time complexity of modules essentially determines the CPU and memory cost of the profiling system 900. The following list shows the definitions of the notations that will be used in the forthcoming complexity analysis:

| Notation | Definition |
| --- | --- |
| F | set of 5-tuple flows in a time interval |
| i | dimension ID (0/1/2/3 = srcIP/dstIP/srcPort/dstPort) |
| $C_i$ | set of clusters in dimension i |
| $S_i$ | set of significant clusters in dimension i |
| $c_i$ | a cluster in dimension i |
| $s_i$ | a significant cluster in dimension i |
| $r_f$ | size of a flow record |
| $r_v$ | size of the volume information of a cluster |
| $r_b$ | size of behavior information of a significant cluster |
| $r_s$ | size of dominant states of a significant cluster |

The time complexity of cluster construction is $O(|F|+\Sigma^3_{i=0}|C_i|)$ for the FTable and the CTable. Similarly, the space complexity is $O(|F|*s_f+\Sigma^3_{i=0}(|C_i|*r_v))$. The time complexity of adaptive thresholding is $\Sigma^3_{i=0}(|C_i|*e_i)$. This module does not allocate additional memory since its operations are mainly on the existing CTable. Thus, the space complexity is zero.

The time complexity of behavior profiling is $O(\Sigma^3_{i=0}\Sigma^{|S_i|}_{j=0}|s_j|)$, while the space complexity is $O(\Sigma^3_{i=0}[|S_i|*(r_b+r_s)]$. The outputs of this step are the behavior profiles of significant clusters, which may be recorded into a database along with the timestamp for further analysis.

In one embodiment, to improve the efficiency of the profiling system 900, thread mechanisms for parallelizing tasks in multiple modules may be used. These thread mechanisms may include continuously importing flow records in the current time interval and profiling flow records that are complete for the previous time interval. Clearly, the parallelization may reduce the time cost of the profiling system. The disadvantage of doing so is the need to maintain a set of FTable and CTable for two consecutive time intervals.

To discover interesting or suspicious network events, the event analysis engine 908 may have three aspects: i) temporal behavior analysis; ii) feature dimension correlation; and iii) event configurations. The objective of temporal behavior analysis is to characterize temporal properties of behavior classes, as well as individual clusters. For instance, temporal properties may help distinguish and classify behavior classes. Feature dimension correlation attempts to find the correlation between clusters from various dimensions to detect emerging exploit and worm activities that often trigger new clusters from srcIP, dstIP and dstPrt dimensions.

In one embodiment, a simple event configuration language is utilized. This language enables network operators or security analysts to extract information on events of interest from behavior profiles for network management or troubleshooting. To express the policy, four distinct fields may be utilized: Dimension, Event Type, Filter, and Description. The options of these fields may include: Dimension=srcIP|dstIP|srcPrt|dstPrt|all; Event Type=rare|deviant|exploit|unusual service ports|all; Filter=high frequency|high intensity|matching selected ports|ect.; and Description=full|summary.

For example, if a network operator wants to monitor rare behavior of srcIP end hosts, she could use the rule "srcIP (Dimension) AND rare (Event Type) AND all (Filter) AND full (Description)," which expresses the policy of reporting full profiles of all srcIP clusters with rare behavior. As will be appreciated by those skilled in the art, other filter rules may be constructed using combinations of available options.

To address performance bottleneck during sudden traffic surges as caused by severe DoS attacks or worm outbreaks, a variety of sampling techniques may be utilized. For example, simple random sampling may be employed. Random sampling is a widely-used simple sampling technique in which each object, flow in our case, is randomly chosen based on the same probability (also known as sampling ratio $\mu$). Clearly, the number of selected flows is entirely decided by the sampling ratio $\mu$. Using a limit of flow records, l, the sampling ratio during sudden traffic increase may be configured as $\mu=l(|F|)^{-1}$.

Random sampling, however, may have substantial impact on behavior accuracy. First, the set of significant clusters from four feature dimensions may be smaller than that without sampling. Second, the behavior of a number of extracted clusters may be altered since flow sampling changes the feature distribution of free dimensions, as well as the behavior classes, for these clusters.

In summary, random sampling may reduce the CPU time and memory cost during sudden traffic surges caused by DoS attacks or worm outbreaks. However, random sampling may reduce the number of interesting events and may also alter the behavior classes of some significant clusters. Such impact may become worse if "lower" sampling rates are selected.

A lesson from random sampling is that the clusters associated with denial of service attacks are usually very large in flow count and, hence, consume a large amount of memory and CPU time. In addition, profiling such behavior does not require a large number of flows, since the feature distributions very likely remain the same even with a small percentage of traffic flows. Based on this insight, a profile-aware filtering solution may be utilized. Such a solution may limit the size of very large clusters and adaptively sample on the rest of clusters when the system is faced with sudden explosive growth in the number of flows.

Figure 10A:
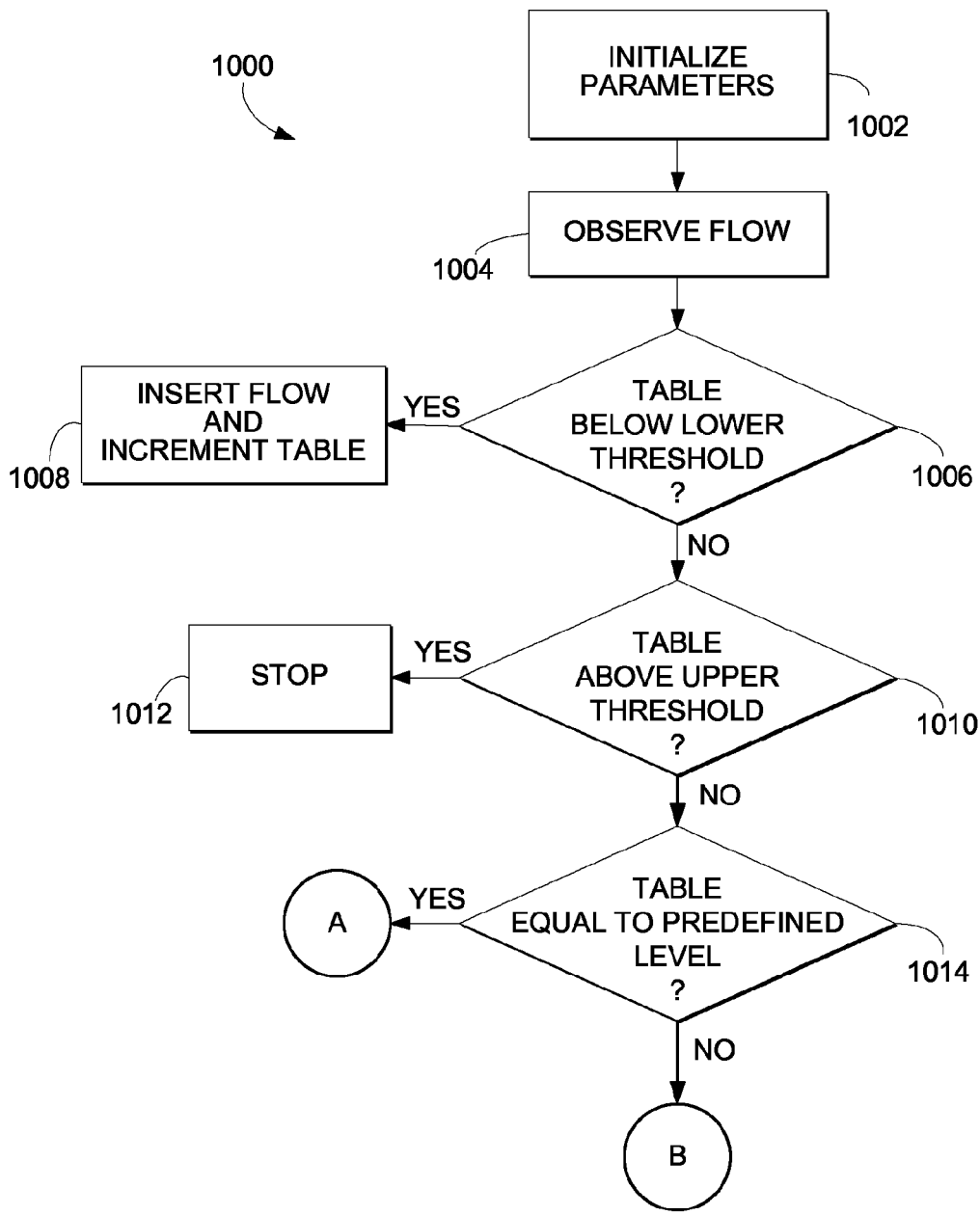
FIGS. 10A-10C illustrate a method in accordance with one embodiment of the present invention for providing profile-aware sampling.
Figure 10B:
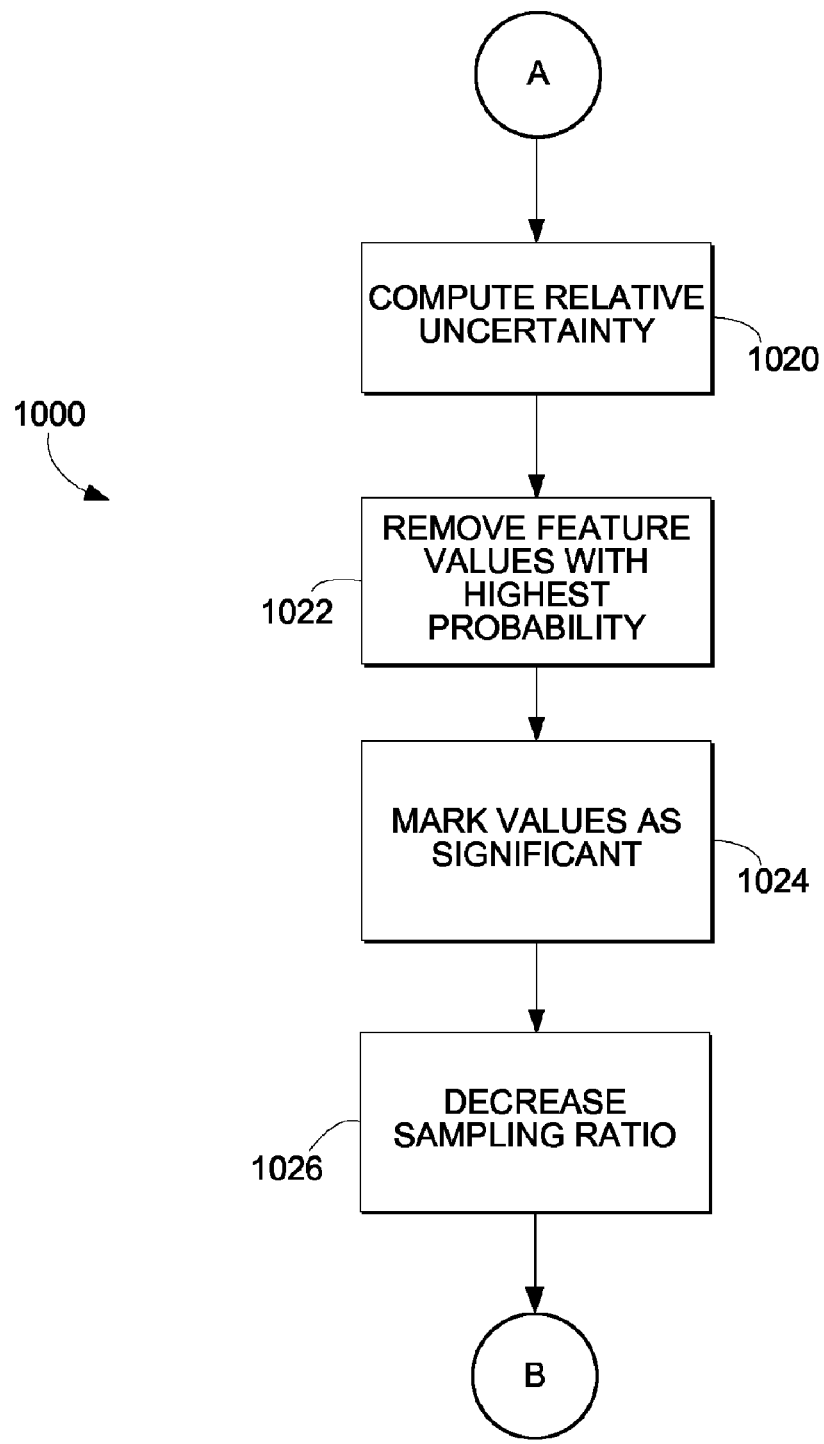
Figure 10C:
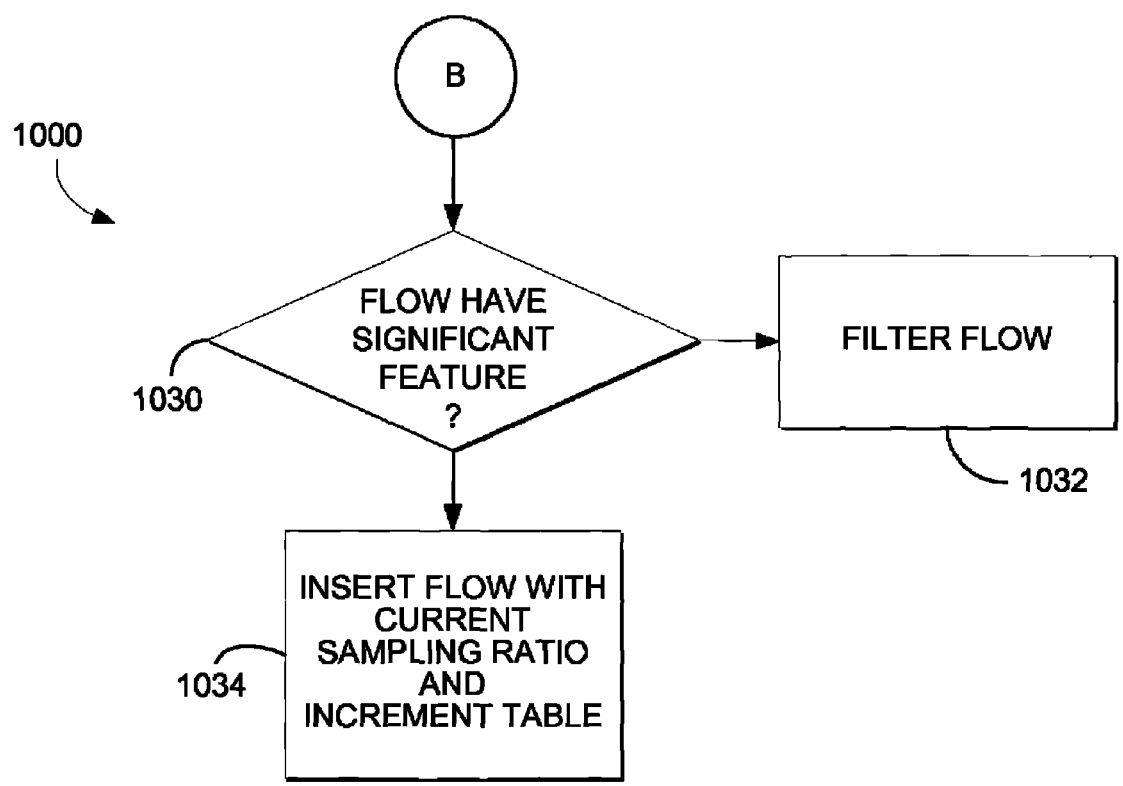

FIGS. 10A-10C illustrate a method 1000 for providing profile-aware sampling. At a step 1002, the method 1000 initializes various parameters. In one embodiment, the method 1000 selects watermarks, L and H. L represents the moving average of flow tables over time, and H represents the maximum size of flow tables that the system will accept. In one embodiment, H may be set to 10M, which is estimated to require 1 GB memory cost. In addition, the method 1000 selects the maximum and minimum sampling ratios, $\mu_{max}$ and $\mu_{min}$. The actual sampling ratio $\mu$ may be adaptively decided based on the flow table size. Specifically, the sampling ratio may become thinner as the size of the flow table increases. Initially, the sampling ratio $\mu$ may be set as $\mu_{max}$. The method 1000 may also select an incremental factor D, as well as a variety of other parameters.

At a step 1004, a flow is observed by the method 1000. Whether this observed flow is placed in the flow table may depend on the size of the flow table. The variable ftable may be used to denote the size of the flow table. At a step 1006, the method 1000 determines whether ftable is below L. If ftable is below L, the method 1000 inserts the flow into the flow table at a step 1008 and increments ftable. If not, the method 1000 determines whether ftable is above H at a step 1010. If it is above H, the method 1000 terminates at a step 1012, without inserting the flow into the table.

If ftable is below H, the method 1000, at a step 1014, determines whether ftable has reached a predefined level. In one embodiment, if ftable is equal to L or another predefined level, i.e., L+i*D, where D is the incremental factor and i=1, 2..., (H-L)/D-1, the method 1000 proceeds to a step 1020, as illustrated by FIG. 10B. If not, the method 1000 proceeds to a step 1030, as illustrated by FIG. 10C.

At the step 1020, the method 1000 computes the relative uncertainty of each dimension for the flows stored in the flow table. Stated another way, the method 1000 evaluates whether there are one or more dominant feature values along each dimension. At a step 1022, the method 1000 removes the feature values having the highest probability (i.e., the dominant features) until the relative uncertainty exceeds a predetermined threshold. The existence of such high probability values (i.e., dominate values) suggests that certain types of flows dominate the flow tables and indicates anomalous traffic patterns. Thus, the method 1000 searches these values and, at a step 1024, marks them as significant clusters for flow filtering.

The method 1000 decreases the sampling ratio at a step 1026. The flow tables may not be able to accept all of the flows with preference after ftable exceeds the L watermark. As a result, each of these flows is added with an adaptive sampling ratio. As the ftable increases, this sampling ratio may decrease. For example, the sampling ratio may vary based on the variable i, which is incremented each time ftable reaches a predefined level. Expressed mathematically, the sampling ratio, $\mu$, may equal to $\mu_{max}-i((\mu_{max}-\mu_{min})((H-L)/(D-1))^{-1})$.

Turning to FIG. 10C, the flow is evaluated at a step 1030 to determine whether it contains a feature value marked as significant. If so, the method 1000 filters the flow at a step 1032. This filtering occurs because flows with significant features will likely not affect the behavior of the associated clusters.

If the flow does not contain a significant feature, the method 1000 samples the flow with the current sampling ratio at a step 1034 and increments ftable. As will be appreciated by those skilled in the art, the method 1000 gives preference to flows that belong to small clusters because they may have substantial contributions to the behavior of such clusters.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for sampling flows observed within traffic traversing a communication link, said method comprising:
   identifying a set of flows observed traversing said communication link, wherein said set of flows has a plurality of dimensions;
   creating a plurality of clusters of flows by grouping together flows that share at least one common dimension;
   assigning, to at least a portion of said plurality of clusters of flows, a probability value relating to the volume of flows in a cluster;
   selecting a probability threshold and an uncertainty threshold, wherein said probability threshold indicates a probability where clusters above the probability threshold are deemed to be significant, and wherein said uncertainty threshold indicates a target level of uncertainty;
   removing from said plurality of clusters one or more clusters that are assigned one or more probability values above said probability threshold, wherein the removed clusters are deemed to be significant clusters;
   computing a relative uncertainty value for probability values assigned to the remaining clusters in said plurality of clusters, wherein said relative uncertainty value indicates uniformity or variability in said probability values assigned to said remaining clusters in said plurality of clusters;
   until said relative uncertainty value exceeds said uncertainty threshold, iteratively decreasing said probability threshold and removing from said remaining clusters in said plurality of clusters one or more clusters that are assigned a probability value above said probability threshold, wherein the removed clusters are deemed to be significant clusters; and
   utilizing said significant clusters to identify one or more clusters exhibiting a rare behavior or one or more clusters exhibiting an anomalous behavior.

2. The method of claim 1, further comprising storing said set of flows in a flow table by utilizing a sampling ratio.

3. The method of claim 2, wherein said sampling ratio varies based on the number of flows stored in said flow table.

4. The method of claim 2, wherein said computing is responsive to the number of flows stored in said flow table reaching a predetermined threshold.

5. The method of claim 1, wherein said plurality of dimensions includes one or more dimensions related to a source port or a destination port.

6. The method of claim 1, further comprising assigning each of a portion of said one or more significant clusters to one of a plurality of behavior classes.

7. A computer-implemented method for storing flows observed traversing a network link, the method comprising:
   utilizing a sampling ratio to select a plurality of flows observed traversing a link on said computer network, wherein said plurality of flows have a plurality of dimensions, wherein the selected flows are stored in a flow table;
   computing a relative uncertainty value for probability values assigned to clusters of flows stored in said flow table, wherein said relative uncertainty value indicates uniformity or variability in said probability values assigned to said clusters;
   until said uncertainty value exceeds an uncertainty threshold;
      (1) removing, from said clusters of flows, clusters whose assigned probability values are above a probability threshold, wherein the removed clusters are deemed to be significant clusters,
      (2) re-computing said relative uncertainty value,
      (3) comparing said relative uncertainty value to said uncertainty threshold, and
      (4) iteratively decreasing said probability threshold when said relative uncertainty value is less than said uncertainty threshold; and
   utilizing said significant clusters to identify one or more clusters exhibiting a rare behavior or one more clusters exhibiting an anomalous behavior.

8. The method of claim 7, further comprising monitoring the number of said plurality of flows storing in said flow table.

9. The method of claim 8, further comprising repeating said computing each time said flow table reaches one or more predetermined sizes.

10. The method of claim 7, wherein said plurality of dimensions includes one or more dimensions related to a source port, a source IP address, a destination port or a destination IP address.

11. The method of claim 7, further comprising decreasing said sampling ratio based on the number of said plurality of flows stored in said flow table.

* * * * *